US012671681B2

(12) United States Patent
Tian

(10) Patent No.: US 12,671,681 B2
(45) Date of Patent: Jun. 30, 2026

(54) AUTOMATIC WEB PAGE LOGIN FOR WEB-BASED APPLICATIONS

(71) Applicant: SAP SE, Walldorf (DE)

(72) Inventor: Zhuang Tian, Beijing (CN)

(73) Assignee: SAP SE, Walldorf (DE)

( * ) Notice: Subject to any disclaimer, the term of this patent is extended or adjusted under 35 U.S.C. 154(b) by 237 days.

(21) Appl. No.: 18/081,804

(22) Filed: Dec. 15, 2022

(65) Prior Publication Data

US 2024/0205215 A1    Jun. 20, 2024

(51) Int. Cl.
*H04L 9/40* (2022.01)

(52) U.S. Cl.
CPC ................................. *H04L 63/0823* (2013.01)

(58) Field of Classification Search
CPC ........................ H04L 63/0823; H04L 63/0815
See application file for complete search history.

(56) References Cited

U.S. PATENT DOCUMENTS

| | | | | |
|---|---|---|---|---|
| 8,646,060 B1 * | 2/2014 | Ben Ayed | ............... | H04W 4/20 |
| | | | | 726/9 |
| 2007/0282963 A1 * | 12/2007 | Mo | ......................... | H04L 51/04 |
| | | | | 707/E17.116 |
| 2013/0212261 A1 * | 8/2013 | Fujii | .................. | H04N 1/00204 |
| | | | | 709/224 |
| 2014/0180701 A1 * | 6/2014 | Grilli | ..................... | G16H 80/00 |
| | | | | 705/2 |
| 2018/0373603 A1 * | 12/2018 | Inage | .................... | G06F 16/252 |
| 2022/0131871 A1 * | 4/2022 | Huang | .................... | G06F 16/22 |
| 2022/0269333 A1 * | 8/2022 | Dedonato | ............ | G04G 9/0064 |

* cited by examiner

*Primary Examiner* — Hany S. Gadalla
(74) *Attorney, Agent, or Firm* — Fish & Richardson P.C.

(57) ABSTRACT

Methods, systems, and computer-readable storage media for automatic login to a website accessible through an application including operations of executing, by a computing device, an application including at least one user interface (UI) provided as a web page of a website, and determining, by the computing device, that a timeout logout has occurred to logout of the website, and at least partially in response, automatically, by the application, transmitting a login request to the website and displaying the web page after logging into the website.

17 Claims, 6 Drawing Sheets

200

202

206

210

AUTOMATIC WEB PAGE LOGIN FOR WEB-BASED APPLICATIONS

BACKGROUND

Users can interact with applications to perform tasks. For example, an enterprise can provision an application for its employees to use to perform work-related tasks in furtherance of enterprise operations. In order to enrich functionality of an application, the application can be provisioned as one or more web pages. Accordingly, the application provides functionality of a browser to enable users to view and interact with web pages to perform tasks. As such, functionality available through the application can be consistent and available on various platforms. However, in accessing web pages, a timeout period is provided, such that, if there is no user activity before expiration of the timeout period, the user is automatically logged out from access to the web page. This can be referred to as a timeout logout. For example, a user may be attending to other matters preventing the user from interacting with the application for the timeout period. When the user returns to the application, the user is logged out. Consequently, efficiencies and user experience are diminished.

SUMMARY

Implementations of the present disclosure are directed to logging into websites through applications, such as mobile applications. More particularly, implementations of the present disclosure are directed to automatically logging back into a website through an application in response to a timeout logout, the application including one or more user interfaces (UIs) provisioned as one or more web pages of the website.

In some implementations, actions include executing, by a computing device, an application including at least one UI provided as a web page of a website, and determining, by the computing device, that a timeout logout has occurred to logout of the website, and at least partially in response, automatically, by the application, transmitting a login request to the website and displaying the web page after logging into the website. Other implementations of this aspect include corresponding systems, apparatus, and computer programs, configured to perform the actions of the methods, encoded on computer storage devices.

These and other implementations can each optionally include one or more of the following features: a middle page is at least temporarily displayed in the application after logout of the website has occurred; automatically, by the application, transmitting a login request is further in response to movement of the application from a background to a foreground; automatically transmitting a login request to the website at least partially comprises executing an authentication process; the authentication process includes certificate-based authentication (CBA); session information is deleted in response to logout of the website; and the computing device is one of a smartphone and a tablet.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
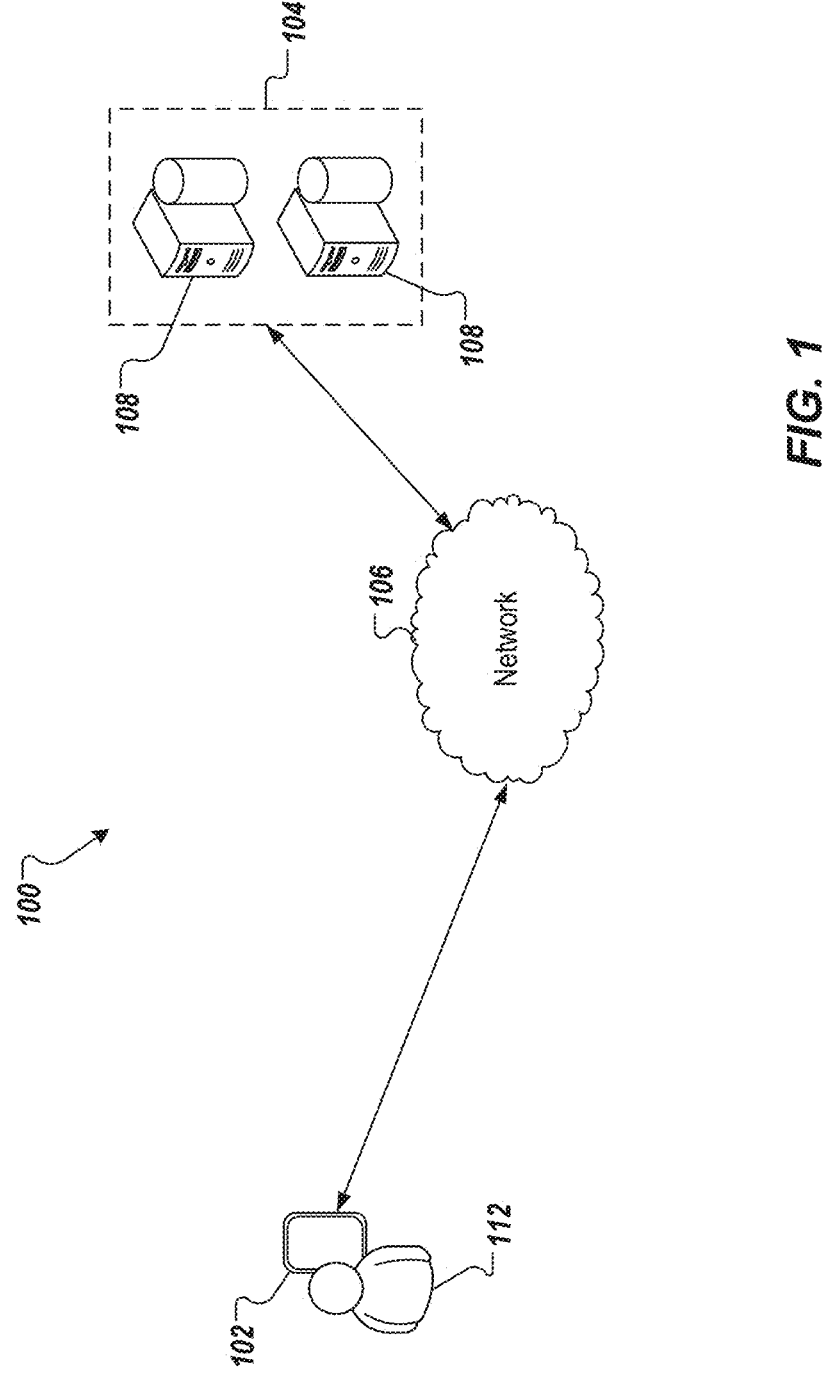
FIG. 1 depicts an example architecture that can be used to execute implementations of the present disclosure.

Implementations of the present disclosure are directed to logging into websites through applications, such as mobile applications. More particularly, implementations of the present disclosure are directed to automatically logging back into a website through an application in response to a timeout logout, the application including one or more user interfaces (UIs) provisioned as one or more web pages of the website. Implementations can include actions of executing, by a computing device, an application including at least one UI provided as a web page of a website, and determining, by the computing device, that a timeout logout has occurred to logout of the website, and at least partially in response, automatically, by the application, transmitting a login request to the website and displaying the web page after logging into the website.

To provide context for implementations of the present disclosure, and as introduced above, users can interact with applications to perform tasks. For example, an enterprise can provision an application for its employees to use to perform work-related tasks in furtherance of enterprise operations. An example application includes, without limitation, SAP® Work Zone provided by SAP® SE of Walldorf, Germany. SAP® Work Zone can be described as providing digital workplaces to increase user productivity and engagement. In some examples, SAP® Work Zone centralizes access to applications, processes, information, and communication in a unified entry point that users can access from any appropriate device (e.g., smartphone, tablet, computer). While SAP® Work Zone is referenced herein as an example application for purposes of illustration, it is contemplated that implementations of the present disclosure can be realized with any appropriate application.

In order to enrich functionality of an application, the application can include one or more UIs provisioned as one or more web pages of a website. Accordingly, the application provides functionality of a browser to enable users to view and interact with web pages to perform tasks. As such, functionality available through the application can be consistent and available on various platforms. For example, versions of the application for various operating systems (e.g., Windows, MacOS, Android, iOS) each access the same web pages to provide the same functionality to users. In this manner, users can access the same functionality regardless of which operating system they are using and the development cycle of the application itself is simplified.

However, in accessing secure websites, a timeout period is provided, such that, if there is no user activity before expiration of the timeout period, the user is automatically logged out from the website. At the same time, the user is effectively logged out of the application. This can be referred to as a timeout logout. For example, a user may be attending to other matters preventing the user from interacting with the application for the timeout period. When the user returns to the application, the user is logged out. Consequently, efficiencies and user experience are diminished.

In view of the above context, implementations of the present disclosure provide for automatically logging back into a website accessed through an application in response to a timeout logout, the application including one or more UIs provisioned as one or more web pages of the website. In some implementations, in response to a timeout logout, it is determined whether the application is in a foreground. If the application is in the foreground, the application automatically sends a login request to the website, which results in the user being automatically logged back into the website. If the application is not in the foreground (i.e., is in a background), automatic login is delayed until the application is brought into the foreground. In response to the application being brought into the foreground, the application automatically sends a login request to the website, which results in the user being automatically logged back into the website. In some examples, foreground means that the application is open and is currently displayed on the display of the computing device for interaction with the user, while background means that the application is open, but is not displayed on the display of the computing device (e.g., multiple applications are open, but only one application is displayed).

FIG. 1 depicts an example architecture 100 in accordance with implementations of the present disclosure. In the depicted example, the example architecture 100 includes a computing device 102, a network 106, and a server system 104. The server system 104 includes one or more server devices and databases 108 (e.g., processors, memory). In the depicted example, a user 112 interacts with the computing device 102.

In some examples, the computing device 102 can communicate with the server system 104 over the network 106. In some examples, the computing device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of computing devices (e.g., the computing device 102 over the network 106).

In accordance with implementations of the present disclosure, and as noted above, the computing device 102 can execute an application (e.g., a mobile application also referred to as a mobile app) that is provisioned using one or more web pages of a website. For example, the application can at least partially function as a browser that enables display of and interaction with the one or more web pages. In some examples, the one or more web pages function as UIs that provide functionality to enable the user 112 to perform one or more tasks. For example, the user 112 can provide input to and receive output from the one or more web pages. In some examples, the server system 104 can host the one or more web pages that are access through the application executing on the computing device 102.

In some implementations, users are authenticated to the application using certificate-based authentication (CBA). While CBA is discussed to illustrate implementations of the present disclosure, it is contemplated that any appropriate authentication can be used.

In general, CBA uses a digital certificate that is generated using cryptography. Each digital certificate represents an entity, such as a user or a device, for example, and is used to grant access to one or more resources, such as, an application, a website, or a network, for example. In some examples, the digital certificate includes a public key, an entity name, a certificate authority (CA) that issued the digital certificate, the date from which the digital certificate is valid, and an expiry date of the digital certificate, among other information. An example digital certificate for CBA includes the X.509 certificate.

In CBA, the entity (e.g., the computing device 102 of FIG. 1) issues a request to access a protected resource (e.g., a server hosting one or more web pages, such as the server system 104 of FIG. 1). The resource that the request is directed to receives the request and sends a resource digital certificate to the entity, which validates the resource digital certificate with the CA. If the resource digital certificate is determined to be valid, the entity sends its entity digital certificate (e.g., in a request head) to the resource, which validates the entity digital certificate with the CA. If the entity digital certificate is determined to be valid, the entity is granted access to the resource.

In the context of the resource including a website, a client-side and a server-side are provided, the client-side being the computing device, the server-side being the server hosting the website. Upon successful login to the website, a time-limited session begins. During the session, if the user does not make any requests within a specified period of time, the session expires. Consequently, the client-side is redirected to a logout page and locally relevant session information is cleared. Example session information can include, but is not limited to, a session identifier (SID) used in request-response interactions between the client-side and the server-side (e.g., hypertext transfer protocol (HTTP) requests), session creation time, and time last accessed. On the server-side, the login information for the user is removed to free-up resources. Because server-side resources are limited, maintaining timed-out user sessions can contribute to high loads and lead to performance degradation.

FIGS. 2A-2G collectively depict a progression representing automatic login into a website through an application in accordance with implementations of the present disclosure. In the examples of FIGS. 2A-2G, UIs are depicted and are representative of SAP Work Zone introduced above. However, and as noted above, it is contemplated that implementations of the present disclosure can be realized with any appropriate application. Further, the examples of FIGS. 2A-2G represent the application as being executed on a smartphone (e.g., as a mobile app). It is contemplated, however, that the application can be executed on any appropriate computing device (e.g., smartphone, tablet computing device).

In some examples, prior to the application enabling user access to web pages of a website (e.g., hosted on a server), an entity digital certificate has already been established on the computing device executing the application. In some examples, in response to starting the application (e.g., a user selecting an icon representing the application), an authentication process is executed, in which the resource and the computing device authenticate one another. For example, and as described herein, CBA can be used, during which the computing device authenticates a resource digital certificate of the resource, and the resource authenticates an entity digital certificate from the computing device.

Figure 2C:
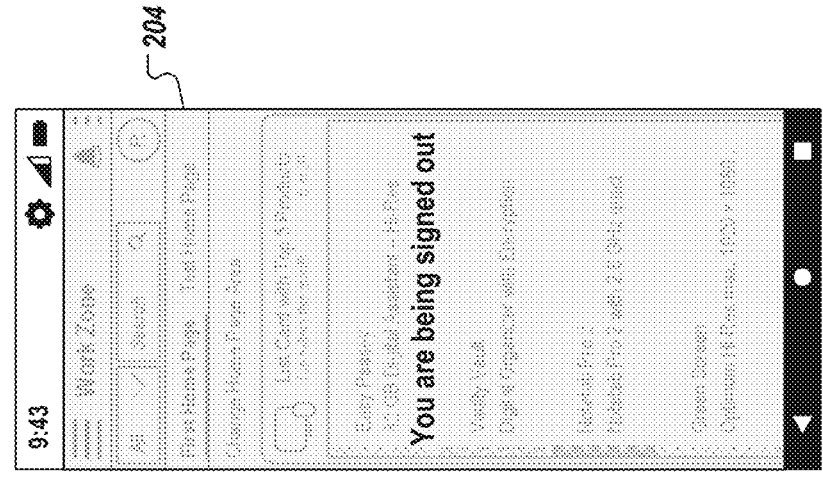
FIGS. 2A-2G collectively depict a progression representing automatic login into a website through an application in accordance with implementations of the present disclosure.
Figure 2B:
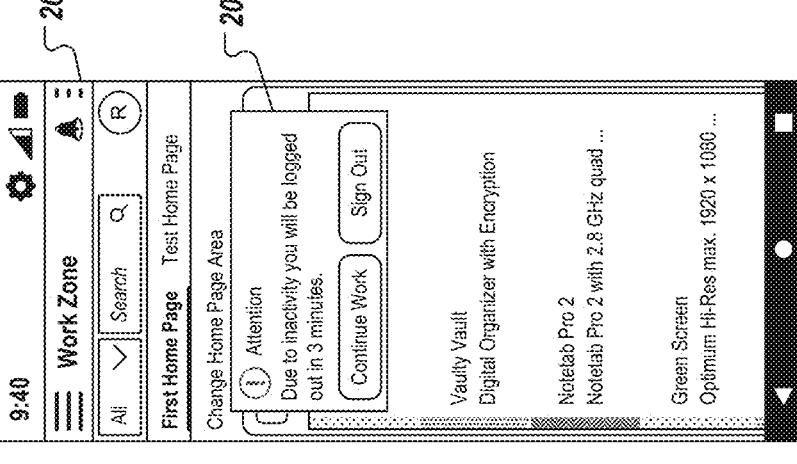
Figure 2A:
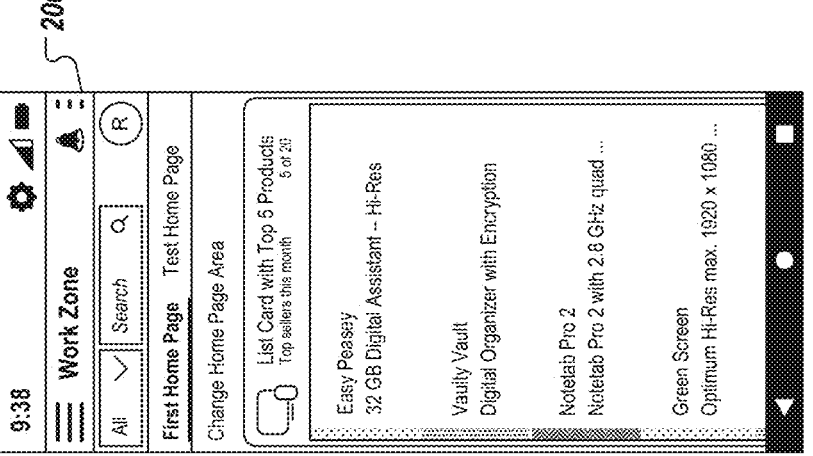

With reference to FIG. 2A, a UI 200 is depicted and represents a home page that a user (e.g., the user 112 of FIG. 1) can access to perform tasks. In some examples, the UI 200 is displayed in response to completion of an authentication process (e.g., CBA). In some examples, the UI 200 is a web page of the website that the user is logged into for access through the application. For example, the web page (among other web pages of the website) is hosted on a server (e.g., the server system 104 of FIG. 1) and is displayed on the computing device in the application.

In accordance with implementations of the present disclosure, a timeout period is provided, such that, if there is no user activity before expiration of the timeout period, the user is automatically logged out from the website. That is, for example, each time the user interacts with the UI 200 (e.g., scrolls, selects an icon, inputs data) a timeout clock begins upon completion of the interaction. If the timeout clock achieves the timeout period (e.g., timeout threshold), the user is logged out of the website (timeout logout). In some examples, during running of the timeout clock, the user can be provided a warning that a logout is impending. For example, and as depicted in the example of FIG. 2B, a warning UI 202 can be displayed to warn the user that a logout is impending. In the example of FIG. 2B, the warning UI 202 enables the user to select between continuing work and signing out. For example, if the user selects to continue work, that user selection (e.g., the user selecting the 'continue work' interface element) effectively functions as a user interaction that resets the timeout clock. As another example, if the user selects to sign out, that user selection (e.g., the user selecting the 'sign out' interface element) functions to log the user out of the website and the application can be closed.

Figure 2D:
Figure 2D:
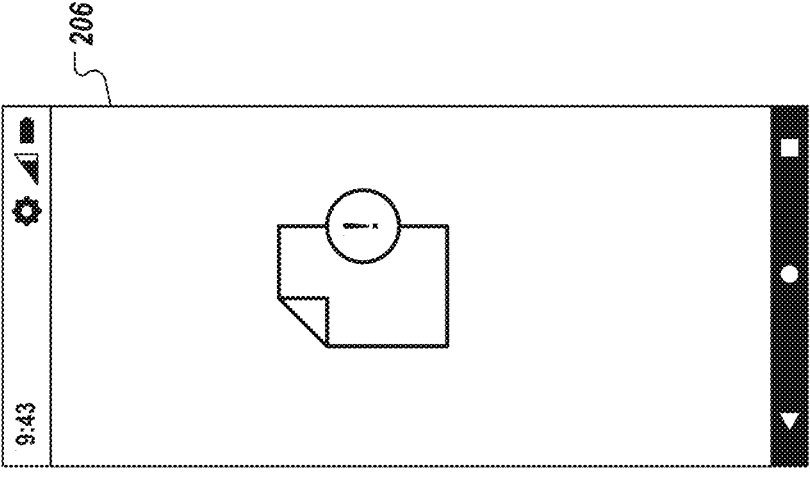

In some examples, upon expiration of the timeout period, a logout from the website is performed. For example, and as depicted in FIG. 2C, a logout page 204 is displayed during the logout processes. Upon completion of the logout process, a middle page 206 can be displayed, as depicted in FIG. 2D. Here, the middle page 206 represents that the user has been logged out of the website that provides the web page(s) that had been displayed in the application. In some examples, while the application itself is still open and executing on the computing device, the middle page 206 represents that the user has been logged out of the website that had been accessed through the application.

Figure 2E:
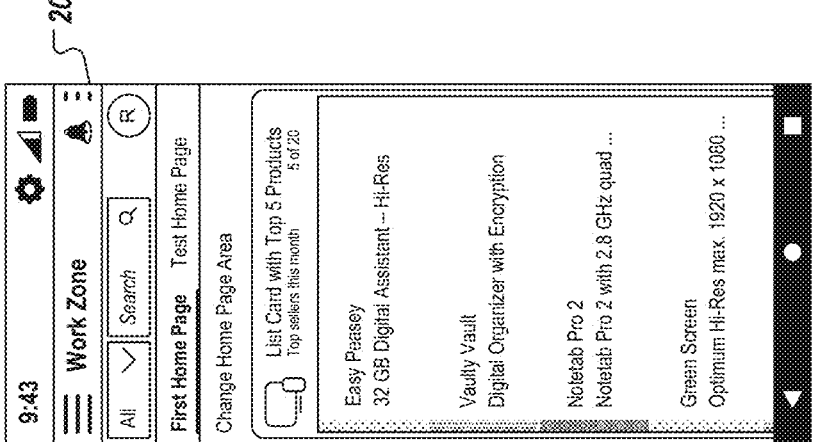

In accordance with implementations of the present disclosure, a login back into the website is automatically performed at least partially in response to an automatic logout from the website. For example, and as described in further detail herein, the application can automatically initiate a login to the website at least partially in response to automatic logout from the website. This is performed without requiring user input to either close the application, restart the application, or request that the application log back into the website. In some examples, automatic login to the website includes initiating the authentication process (e.g., CBA) by automatically sending, by the application, a login request to the website. After login, the website is again accessible through the application. For example, the UI 200 can again be displayed to the user, as represented in FIG. 2E.

In some examples, tolling of the timeout period and subsequent logout is performed while the application is in the foreground. For example, at any given instant, the computing device executing the application can have multiple applications open and executing. In the case of multiple open applications, an application that is in the foreground is one that is viewable to the user in the display of the computing device. Consequently, if the application (e.g., SAP® Work Zone) is in the foreground, the user would be able to see the UI 200, the warning UI 202, and the logout page 204. In some examples, and while the application is in the foreground, the middle page 206 can be at least briefly displayed before automatic login is performed. In some instances, the user may be distracted (e.g., attending to other matters) during the automatic logout progression, hence, for example, not stopping the automatic logout process (e.g., by selecting the 'continue work' interface element of the earning UI 202 of FIG. 2B). In some implementations, if the application is in the foreground, the automatic login process is performed without requiring user action.

Figure 2G:
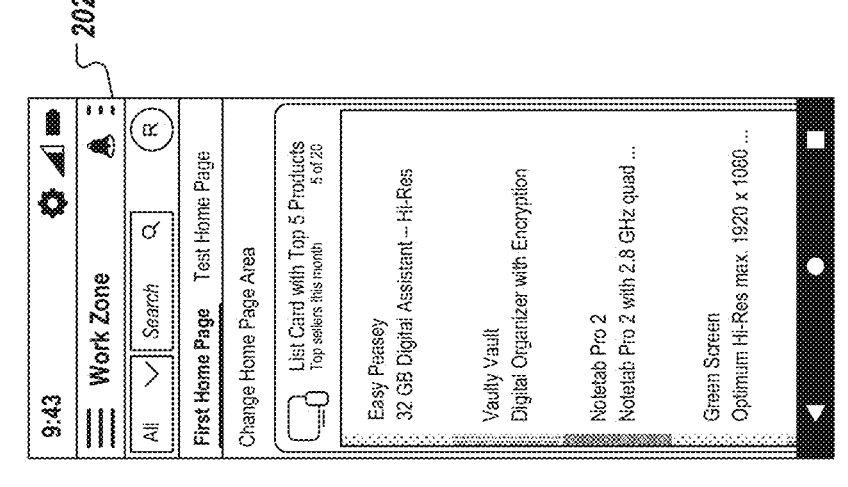
Figure 2F:
Figure 2F:
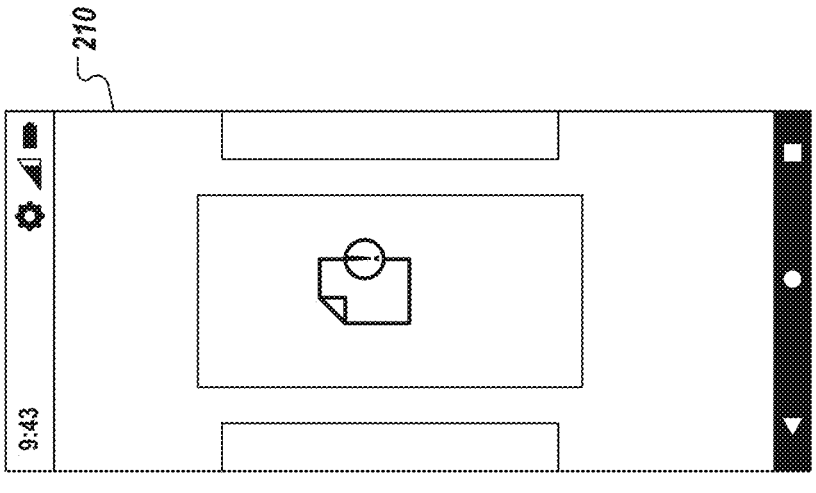

In some examples, tolling of the timeout period and subsequent logout is performed while the application is in the background. For example, and as discussed above, in the case of multiple open applications, the application displaying the UI 200 can be in the background. For example, the user may be interacting with another application on the computing device. Consequently, if the application (e.g., SAP Work Zone) is in the background, the user would not be able to see the UI 200, the warning UI 202, the logout page 204, and the middle page 206. In some implementations, if the application is in the background, the automatic login process is delayed until the application is brought to the foreground. That is, the user selects the application to be brought to the foreground, and in response, automatic login is performed. This is depicted in the example progression of FIGS. 2F and 2G. In FIG. 2F, an application selection UI 210 displays icons representative of open applications, which the user can scroll through. The user can select an icon, which results in the respective application being brought to the foreground. In response to the application (e.g., SAP Work Zone) being brought to the foreground, automatic login is performed, such that the website is again accessible through the application. For example, the UI 200 can again be displayed to the user, as represented in FIG. 2G.

Figure 3:
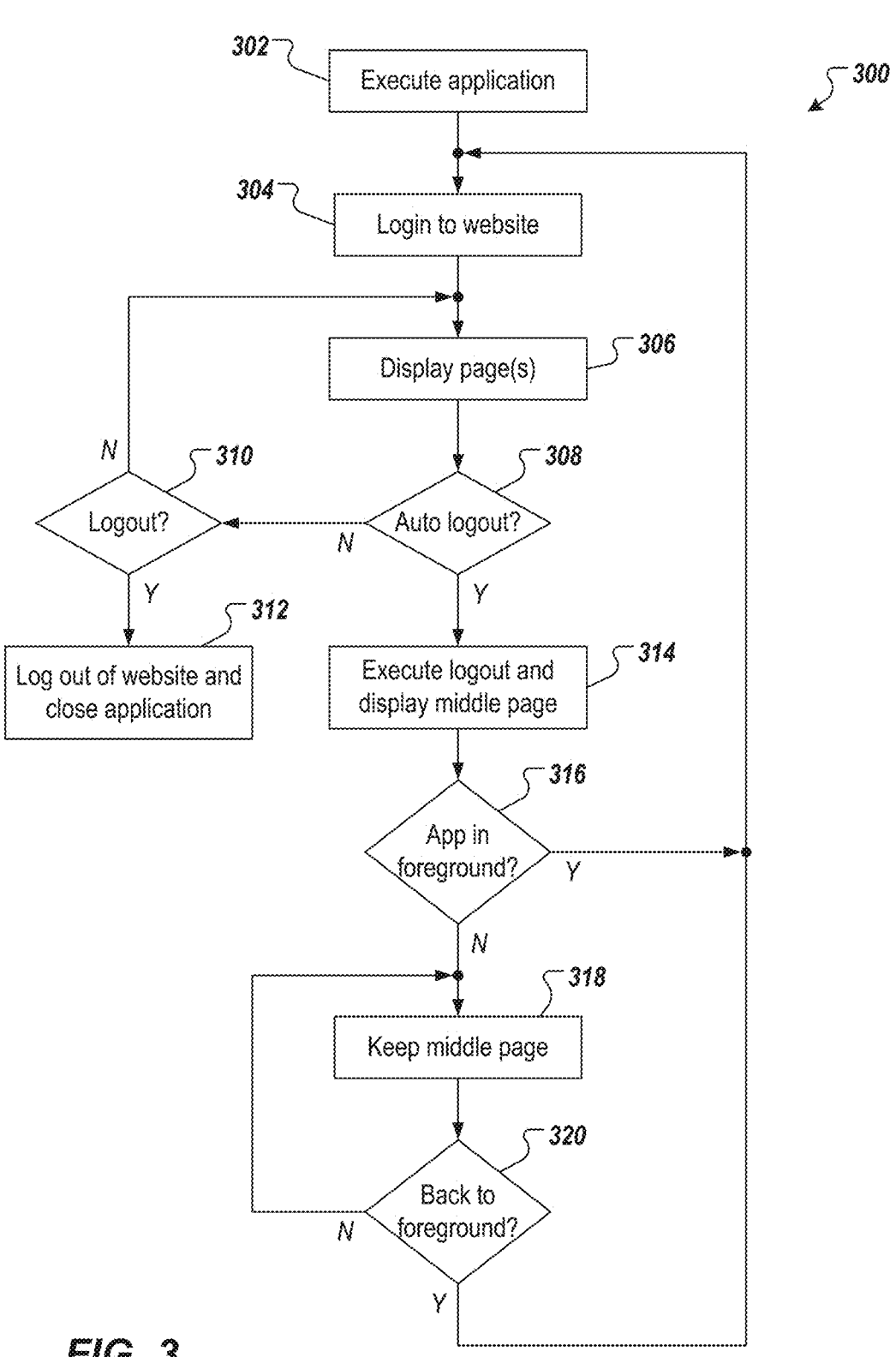
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices. For example, the example process 300 can be executed by a computing device (e.g., the computing device 102 of FIG. 1).

An application is executed (302). For example, and as described herein, a user can open an application on a computing device (e.g., smartphone, tablet). A website accessible through the application is logged into (304). For example, and as described herein, in response to opening of the application, an authentication process (e.g., CBA) can be automatically performed to enable the user to access one or more web pages through the application. In the context of the present disclosure, each web page functions as a UI in the application. One or more web pages are displayed (306). For example, and as described herein, a web page can be displayed on the computing device through the application to enable the user to interact with the web page in performing one or more tasks.

It is determined whether an automatic logout is to be performed (308). For example, and as described herein, it can be determined whether a timeout period has expired, such that a timeout logout is to be executed. If an automatic logout is not to be performed, it is determined whether a logout has been requested (310). For example, and as described herein, the user can actively logout of the application. In some examples, the user can logout by closing the application on the computing device. In some examples, the user can logout by selecting a logout option in the application (e.g., selecting the 'sign out' interface element depicted in FIG. 2B). If a logout has not been requested, the example process 300 loops back. If a logout has been requested, a logout from the website is performed (312).

If an automatic logout is to be performed, the logout is executed and a middle page is displayed (314). For example, and as described herein, a logout from the website can be executed and a middle page (e.g., the middle page 206 of FIG. 2D) can be displayed. It is determined whether the application is in the foreground (316). If the application is not in the foreground, the middle page is maintained (318) and it is determined whether the application has been moved to the foreground (320). If the application has not been moved to the foreground, the example process 300 loops back. If the application is in the foreground or has moved back to the foreground from the background, the example process 300 loops back and the application automatically logs into the website (304).

Figure 4:
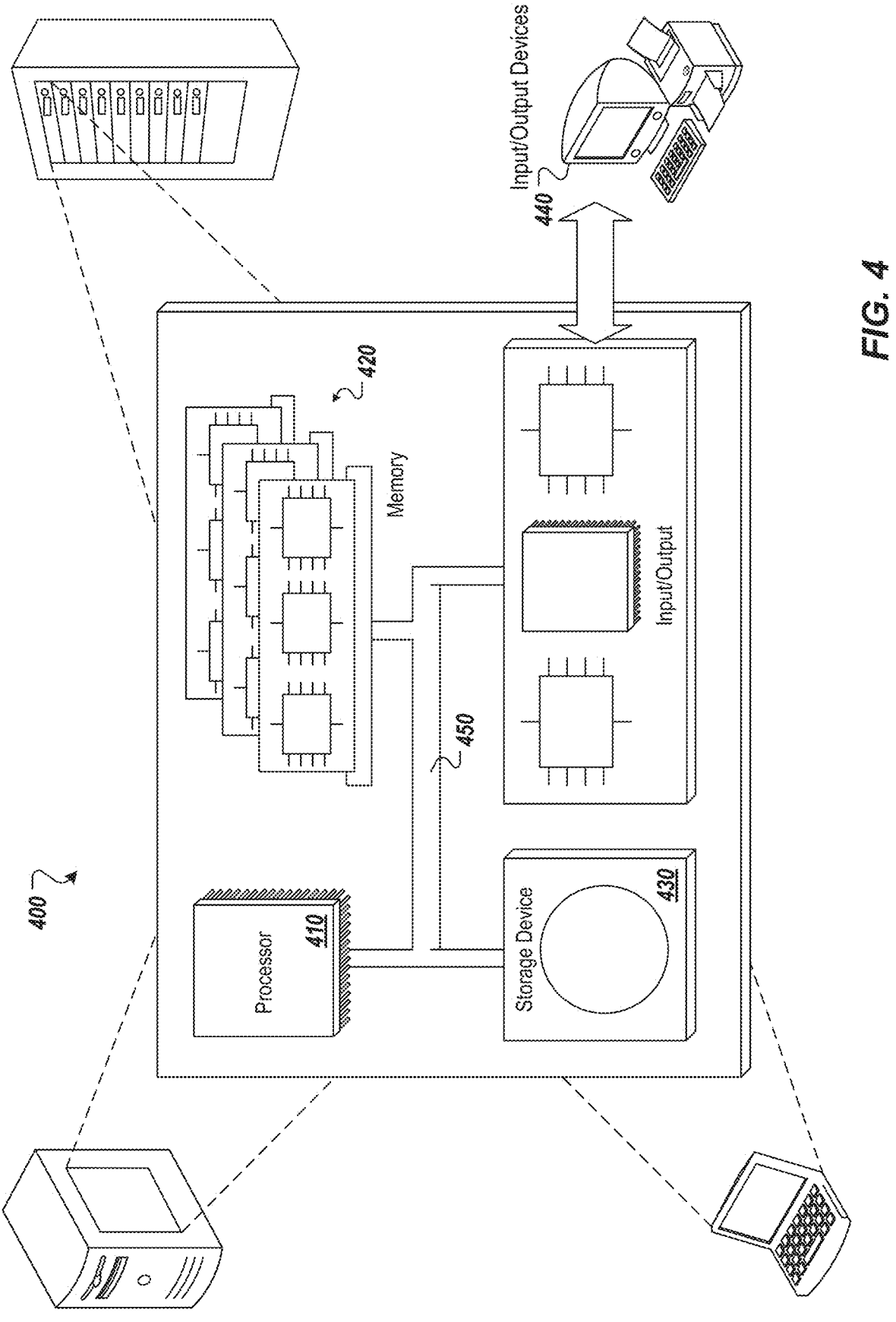
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for automatic login to a website accessible through an application, the method being executed by one or more processors and comprising:
   receiving, by a computing device, input indicating that an application is to be executed, and in response:
      executing an authentication process between the computing device and a website by sending an entity digital certificate of the computing device to the website, and in response to successful execution of the authentication process:
         displaying, by the computing device and in the application, at least one user interface (UI) provided as a web page of the website; and
      determining, by the computing device, that a timeout logout has occurred to logout of the website, and at least partially in response:
         automatically, by the application, transmitting a login request to the website using the entity digital certificate of the computing device, and displaying the web page after logging into the website,
      wherein automatically, by the application, transmitting a login request is further in response to movement of the application from the background to a foreground, and
      wherein tolling of a timeout period for the timeout logout is performed while the application is in a background relative to at least one other application.

2. The method of claim 1, wherein a middle page is at least temporarily displayed in the application after logout of the website has occurred.

3. The method of claim 1, wherein automatically transmitting a login request to the website at least partially comprises executing the authentication process.

4. The method of claim 3, wherein the authentication process comprises certificate-based authentication (CBA).

5. The method of claim 1, wherein session information is deleted in response to logout of the website.

6. The method of claim 1, wherein the computing device comprises one of a smartphone and a tablet.

7. A non-transitory computer-readable storage medium coupled to one or more processors and having instructions stored thereon which, when executed by the one or more processors, cause the one or more processors to perform operations for automatic login to a website accessible through an application, the operations comprising:
   receiving, by a computing device, input indicating that an application is to be executed, and in response:
      executing an authentication process between the computing device and a website by sending an entity digital certificate of the computing device to the website, and in response to successful execution of the authentication process:
         displaying, by the computing device and in the application, at least one user interface (UI) provided as a web page of the website; and
      determining, by the computing device, that a timeout logout has occurred to logout of the website, and at least partially in response:
         automatically, by the application, transmitting a login request to the website using the entity digital certificate of the computing device, and displaying the web page after logging into the website,
      wherein automatically, by the application, transmitting a login request is further in response to movement of the application from the background to a foreground, and
      wherein tolling of a timeout period for the timeout logout is performed while the application is in a background relative to at least one other application.

8. The non-transitory computer-readable storage medium of claim 7, wherein a middle page is at least temporarily displayed in the application after logout of the website has occurred.

9. The non-transitory computer-readable storage medium of claim 7, wherein automatically transmitting a login request to the website at least partially comprises executing the authentication process.

10. The non-transitory computer-readable storage medium of claim 9, wherein the authentication process comprises certificate-based authentication (CBA).

11. The non-transitory computer-readable storage medium of claim 7, wherein session information is deleted in response to logout of the website.

12. The non-transitory computer-readable storage medium of claim 7, wherein the computing device comprises one of a smartphone and a tablet.

13. A system, comprising:
   a computing device; and
   a computer-readable storage device coupled to the computing device and having instructions stored thereon which, when executed by the computing device, cause the computing device to perform operations for automatic login to a website accessible through an application, the operations comprising:
      receiving, by a computing device, input indicating that an application is to be executed, and in response:
         executing an authentication process between the computing device and a website by sending an entity digital certificate of the computing device to the website, and in response to successful execution of the authentication process:

displaying, by the computing device and in the application, at least one user interface (UI) provided as a web page of the website; and determining, by the computing device, that a timeout logout has occurred to logout of the website, and at least partially in response:

automatically, by the application, transmitting a login request to the website using the entity digital certificate of the computing device, and displaying the web page after logging into the website, wherein automatically, by the application, transmitting a login request is further in response to movement of the application from the background to a foreground, and wherein tolling of a timeout period for the timeout logout is performed while the application is in a background relative to at least one other application.

14. The system of claim 13, wherein a middle page is at least temporarily displayed in the application after logout of the website has occurred.

15. The system of claim 13, wherein automatically transmitting a login request to the website at least partially comprises executing the authentication process.

16. The system of claim 15, wherein the authentication process comprises certificate-based authentication (CBA).

17. The system of claim 13, wherein session information is deleted in response to logout of the website.

* * * * *